United States Patent
He

(10) Patent No.: US 12,499,514 B2
(45) Date of Patent: Dec. 16, 2025

(54) ANIMAL FACE STYLE IMAGE GENERATION METHOD AND APPARATUS, MODEL TRAINING METHOD AND APPARATUS, AND DEVICE

(71) Applicant: BEIJING ZITIAO NETWORK TECHNOLOGY CO., LTD., Beijing (CN)

(72) Inventor: Qian He, Beijing (CN)

(73) Assignee: BEIJING ZITIAO NETWORK TECHNOLOGY CO., LTD., Beijing (CN)

(*) Notice: Subject to any disclaimer, the term of this patent is extended or adjusted under 35 U.S.C. 154(b) by 292 days.

(21) Appl. No.: 18/252,855

(22) PCT Filed: Nov. 12, 2021

(86) PCT No.: PCT/CN2021/130301
§ 371 (c)(1),
(2) Date: May 12, 2023

(87) PCT Pub. No.: WO2022/100690
PCT Pub. Date: May 19, 2022

(65) Prior Publication Data
US 2024/0005466 A1 Jan. 4, 2024

(30) Foreign Application Priority Data
Nov. 13, 2020 (CN) .......................... 202011269334.0

(51) Int. Cl.
*G06T 5/50* (2006.01)
*G06T 7/12* (2017.01)
*G06T 11/60* (2006.01)
*G06V 40/16* (2022.01)

(52) U.S. Cl.
CPC .................. *G06T 5/50* (2013.01); *G06T 7/12* (2017.01); *G06T 11/60* (2013.01); *G06V 40/171* (2022.01);
(Continued)

(58) Field of Classification Search
None
See application file for complete search history.

(56) References Cited

U.S. PATENT DOCUMENTS

2018/0189553 A1  7/2018  Guo et al.
2021/0334942 A1* 10/2021  Wang .................. G06T 5/50

FOREIGN PATENT DOCUMENTS

CN    110930297 A    3/2020
CN    111783647 A   10/2020
(Continued)

OTHER PUBLICATIONS

International Search Report (with English translation) and Written Opinion issued in PCT/CN2021/130301, dated Feb. 10, 2022, 14 pages provided.
(Continued)

Primary Examiner — Yanna Wu
(74) Attorney, Agent, or Firm — Astute IP Law Group

(57) ABSTRACT

An animal face style image generation method, a model training method, and a device are provided. The method includes: acquiring an original human face image; and obtaining an animal face style image corresponding to the original human face image. The animal face style image refers to an image obtained by transforming a human face on the original human face image into an animal face, the animal face style image generation model is obtained by training with a first human face sample image and a first animal face style sample image, the first animal face style sample image is generated from the first human face sample
(Continued)

image by a pre-trained animal face generation model, and the animal face generation model is obtained by training with a second human face sample image and a first animal face sample image.

19 Claims, 3 Drawing Sheets

(52) U.S. Cl.
 CPC .............. *G06T 2207/20081* (2013.01); *G06T 2207/20221* (2013.01); *G06T 2207/30201* (2013.01)

(56) References Cited

FOREIGN PATENT DOCUMENTS

| CN | 111968029 A | 11/2020 |
| CN | 112330534 A | 2/2021 |
| CN | 112989904 A | 6/2021 |
| WO | 2019198850 A1 | 10/2019 |

OTHER PUBLICATIONS

Choi et al., "StarGAN v2: Diverse Image Synthesis for Multiple Domains", 2020 IEEE/CVF Conference on Computer Vision and Pattern Recognition, Aug. 5, 2020, pp. 8185-8194.

Liang Zi Wei, "Generating the "cat and dog version" of Trump, and breaking the face editing tool StarGANv2", https://ishare.ifeng.com/c/s/7w2keWci1Dq, Apr. 28, 2020, with English translation.

Office Action issued in Japanese Application No. 2023-528414, dated Apr. 23, 2024, with machine translation.

Decision to Grant a Patent for Japanese Patent Application No. 2023-528414, mailed on Oct. 29, 2024, 5 pages.

\* cited by examiner

ANIMAL FACE STYLE IMAGE GENERATION METHOD AND APPARATUS, MODEL TRAINING METHOD AND APPARATUS, AND DEVICE

The present application is the national phase of International Patent Application No. PCT/CN2021/130301 filed on Nov. 12, 2021, which claims priority to Chinese Patent Application No. 202011269334.0, titled "ANIMAL FACE STYLE IMAGE GENERATION METHOD AND APPARATUS, MODEL TRAINING METHOD AND APPARATUS, AND DEVICE", filed on Nov. 13, 2020 with the China National Intellectual Property Administration, both of which are incorporated herein by reference in their entireties.

FIELD

The present disclosure relates to the technical field of image processing, and in particular, to a method for generating an animal face style image, a model training method, an apparatus and a device.

BACKGROUND

With the development of image processing technology, functions of video interactive applications are gradually enriched, and image style transformation is getting popular. Image style transformation refers to transforming one or more images from a style to another one. However, the conventional video interactive applications only support transformation to limited types of style, which is not interesting enough and results in poor user experience, so the conventional video interactive applications cannot meet users' personalized requirements for image style transformation.

SUMMARY

In order to solve the above technical problem or at least partially solve the above technical problem, a method for generating an animal face style image, a model training method, an apparatus and a device are provided according to the embodiments of the present disclosure.

In a first aspect, a method for generating an animal face style image is provided according to an embodiment of the present disclosure. The method includes: acquiring an original human face image; and obtaining an animal face style image corresponding to the original human face image by using a pre-trained animal face style image generation model. The animal face style image refers to an image obtained by transforming a human face on the original human face image into an animal face. The animal face style image generation model is obtained by training with a first human face sample image and a first animal face style sample image. The first animal face style sample image is generated from the first human face sample image by a pre-trained animal face generation model. The animal face generation model is obtained by training with a second human face sample image and a first animal face sample image In a second aspect, a method for training an animal face style image generation model is further provided according to an embodiment of the present disclosure. The method includes: training an image generation model with a second human face sample image and a first animal face sample image to obtain an animal face generation model; obtaining a first animal face style sample image corresponding to a first human face sample image by using the animal face generation model, where the first animal face style sample image refers to an image obtained by transforming a human face on the first human face sample image into an animal face; and training a style image generation model with the first human face sample image and the first animal face style sample image to obtain an animal face style image generation model. The animal face style image generation model is used for obtaining an animal face style image corresponding to an original human face image. The animal face style image refers to an image obtained by transforming a human face on the original human face image into an animal face.

In a third aspect, an apparatus for generating an animal face style image is further provided according to an embodiment of the present disclosure. The apparatus includes an original human face image acquisition module and a style image generation module. The original human face image acquisition module is configured to acquire an original human face image. The style image generation module is configured to obtain an animal face style image corresponding to the original human face image by using a pre-trained animal face style image generation model. The animal face style image refers to an image obtained by transforming a human face on the original human face image into an animal face. The animal face style image generation model is obtained by training with a first human face sample image and a first animal face style sample image. The first animal face style sample image is generated from the first human face sample image by a pre-trained animal face generation model. The animal face generation model is obtained by training with a second human face sample image and a first animal face sample image.

In a fourth aspect, an apparatus for training an animal face style image generation model is further provided according to an embodiment of the present disclosure. The apparatus includes an animal face generation model training module, a style sample image generation module and a style image generation model training module. The animal face generation model training module is configured to: train an image generation model with a second human face sample image and a first animal face sample image to obtain an animal face generation model. The style sample image generation module is configured to obtain a first animal face style sample image corresponding to a first human face sample image by using the animal face generation model, where the first animal face style sample image refers to an image obtained by transforming a human face on the first human face sample image into an animal face. The style image generation model training module is configured to train a style image generation model with the first human face sample image and the first animal face style sample image to obtain an animal face style image generation model. The animal face style image generation model is used for obtaining an animal face style image corresponding to an original human face image, and the animal face style image refers to an image obtained by transforming a human face on the original human face image into an animal face.

In a fifth aspect, an electronic device is further provided according to an embodiment of the present disclosure. The electronic device includes a memory and a processor. The memory stores a computer program that, when executed by the processor, causes the processor to implement any method for generating an animal face style image or implement the method for training an animal face style image generation model according to the embodiments of the present disclosure.

In a sixth aspect, a computer-readable storage medium is further provided according to an embodiment of the present disclosure. The storage medium stores a computer program that, when executed by the processor, causes the processor to implement any method for generating an animal face style image or implement the method for training an animal face style image generation model according to the embodiments of the present disclosure The technical solutions according to the embodiments of the present disclosure have at least the following advantages compared with the conventional technology.

In the embodiments of the present disclosure, an animal face style image generation model may be pre-trained in a server, and then the animal face style image generation model is sent to the terminal for being called to generate an animal face style image corresponding to an original human face image, which enriches image editing functions of the terminal. Taking a video interactive application as an example, the animal face style image generation model is called to obtain an animal face style image corresponding to an original human face image, which not only enriches image editing functions of the application, but also enhances fun of the video interactive application, providing users with relatively new special effects and improving the user experience. In addition, with the animal face style image generation model, animal face style images matching original human face images can be dynamically generated for different users, improving intelligence in generation of the animal face style images and presenting a better image effect, for example, obtaining a vivid animal face style image.

BRIEF DESCRIPTION OF THE DRAWINGS

The drawings herein are incorporated into the specification and constitute a part of the specification. The drawings show embodiments of the present disclosure. The drawings and the specification are intended to explain the principle of the present disclosure.

In order to more clearly illustrate technical solutions in embodiments of the present disclosure or in the conventional technology, the drawings to be used in the description of the embodiments or the conventional technology are briefly described below. Apparently, those skilled in the art may obtain other drawings according to the provided drawings without any creative work.

DETAILED DESCRIPTION OF EMBODIMENTS

In order to better understand the above purposes, features, and advantage of the present disclosure, the solutions according to the embodiments of the present disclosure are further described hereinafter. It should be noted that the embodiments of the present disclosure and the features in the embodiments may be combined with each other if there is no conflict.

In the following description, numerous specific details are set forth in order to provide thorough understanding of the present disclosure. The present disclosure may be implemented in other ways different from those described here. Apparently, the embodiments in the specification are only a part of the embodiments of the present disclosure, rather than all the embodiments.

Figure 1:
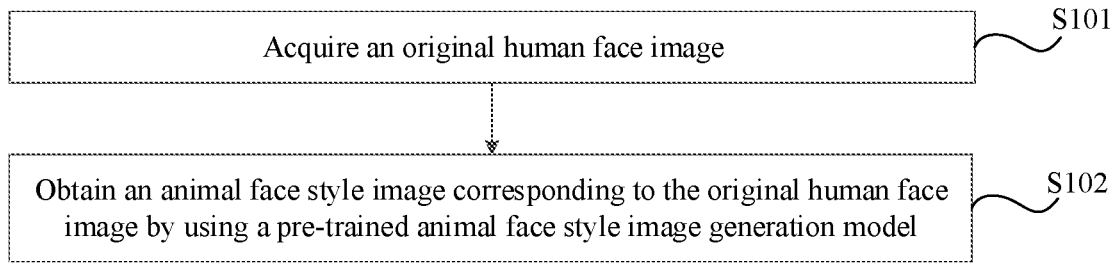
FIG. 1 is a flowchart of a method for generating an animal face style image according to an embodiment of the present disclosure.

FIG. 1 is a flowchart of a method for generating an animal face style image according to an embodiment of the present disclosure. The method for generating an animal face style image may be performed by an apparatus for generating an animal face style image. The apparatus may be implemented by software and/or hardware. The apparatus may be integrated in any electronic device with computing function, for example, a terminal such as a smart phone, a tablet, and a laptop.

The apparatus for generating an animal face style image may be implemented in a form of an independent application or a mini program integrated on a public platform. Alternatively, the apparatus for generating an animal face style image may be implemented as a functional module integrated in an application or a mini program having a function of generating a style image. The application having the function of generating a style image may include but not limited to a video interactive application. The mini program may include but not limited to a video interactive mini program.

The method for generating an animal face style image according to an embodiment of the present disclosure may be applied to a scene in which an animal face style image is required to be obtained. In the embodiments of the present disclosure, an animal face style image or an animal face style sample image refers to an image obtained by transforming a human face into an animal face. For example, an image in animal face style is obtained by transforming a human face into a cat face, a dog face or a face of other animals. Moreover, after the human face is transformed into an animal face, an expression on the human face may be the same as an expression on the animal face, and states of facial features on the human face may also be the same as states of facial features on the animal face. For example, the human face expresses a smile, and the animal face correspondingly expresses a smile. Eyes on the human face are open, and eyes on the animal face are correspondingly open.

As shown in FIG. 1, the method for generating an animal face style image according to an embodiment of the present disclosure may include the following steps S101 and S102.

In step S101, an original human face image is acquired.

For example, when a user has a requirement of generating an animal face style image, an image stored in a terminal may be acquired, or an image or a video may be captured in real time by an image capture device of the terminal. The apparatus for generating an animal face style image acquires a to-be-processed original human face image based on an image selection operation, an image capture operation or an image upload operation performed by the user on the terminal.

Taking a case in which the user calls the image capture device (for example, a camera) of the terminal through a video interactive application to capture an image in real time as an example, prompt regarding image capture may be displayed on an image capturing interface after the video interactive application jumps to the image capturing interface. The prompt regarding image capture may be used for prompting the user to arrange the face in the human face image on the image capturing interface at a preset position on the screen of the terminal (for example, the middle of the screen) and prompting the user to adjust at least one of a distance between the face and the screen of the terminal (by adjusting the distance, a face region with an appropriate size can be obtained on the image capturing interface, avoiding a too large or too small face region), a rotation angle of the face (different rotation angles correspond to different face orientations such as a front face or a side face), and other information. The user captures an image based on the prompt regarding image capture, so that the video interactive application can acquire the original human face image that meets an input requirement of the animal face style image generation model. The input requirement of the animal face style image generation model may refer to a restriction on the input image, such as position of a human face on the input image, a size of the input image, or the like.

Furthermore, the video interactive application may pre-store a photo template based on the input requirement of the animal face style image generation model. The photo template pre-defines information such as the position of the user face on the image, a size of a face region in the image, an angle of the face, and a size of the image. The video interactive application may acquire the required original human face image by using the photo template based on a capture operation of the user.

Apparently, in a case that the image captured by the user does not meet the requirements (such as the position of the human face on the image or the size of the image) for the input of the animal face style image generation model, an operation such as cropping, scaling, rotation or the like may be performed on the image captured by the user to obtain an original human face image that meets the input requirement of the model.

In step S102, an animal face style image corresponding to the original human face image is obtained by using a pre-trained animal face style image generation model.

The animal face style image refers to the image obtained by transforming the human face on the original human face image into an animal face. The animal face style image generation model has a function of transforming a human face into an animal face. The animal face style image generation model is obtained by training with a first human face sample image and a first animal face style sample image. The first animal face style sample image is generated by a pre-trained animal face generation model based on the first human face sample image. That is, the animal face generation model has a function of generating an animal face style image for any human face image, and transforms the human face on the first human face sample image into an animal face to obtain the corresponding first animal face style sample image. The animal face generation model is obtained by training with a second human face sample image and a first animal face sample image. The first animal face sample image refers to an animal face image showing real animal facial features. The second human face sample image and the first human face sample image may be same human face images or different human face images, which is not limited in the disclosure.

In addition, multiple first animal face sample images participating in the training of the animal face generation model correspond to a same animal species. For example, the multiple first animal face sample images participating in the training of the animal face generation model are animal face images all corresponding to cats or all corresponding to dogs. Specifically, the multiple first animal face sample images participating in training of the animal face generation model may be animal face images all corresponding to a same animal breed under a same animal species. For example, the multiple first animal face sample images participating in training of the animal face generation model are animal face images all corresponding to civet cat breed or all corresponding to Persian cat breed. That is, in the embodiments of the present disclosure, multiple animal face generation models may be trained for different animal species or different animal breeds under a same animal species, so that each animal face generation model has a function of generating animal face images corresponding to a specific animal species or a specific animal breed. The first animal face sample image may be from Internet animal images.

The process of training the above models is not limited in the embodiments of the present disclosure. Those skilled in the art can train the model in any available way considering the function of the model. For example, the above model may be trained as follows. Firstly, an image generation model is trained with the second human face sample image and the first animal face sample image to obtain the animal face generation model. The image generation model may include but not limited to Generic Adversarial Networks (GaN) model, Style-Based Generator Architecture for Generic Adversarial Networks (Stylegan) model, and the like. Then, the first animal face style sample image corresponding to the first human face sample image is obtained by using the animal face generation model. The first animal face style sample image refers to the image obtained by transforming the human face on the first human face sample image into an animal face. Finally, a style image generation model is trained with the first human face sample image and the first animal face style sample image to obtain the animal face style image generation model. The style image generation model may include a Conditional Generative Adversarial Networks (CGAN) model, a Cycle Consistent Adversarial Networks (Cycle-Gan) model, and the like.

The first animal face style sample image corresponding to the first human face sample image is obtained by using the animal face generation model. Then the first human face sample image and the first animal face style sample image serve as a pair of training samples in the training of the animal face style image generation model, which ensures an effect of training the animal face style image generation model, thereby ensuring a good display effect of the generated animal face style image corresponding to the original human face image, for example, obtaining a vivid animal face style image.

On the basis of the above technical solutions, in an embodiment, the first human face sample image is obtained by performing human face position adjustment on a first original human face sample image based on first correspondence between human face key points in the first original human face sample image and animal face key points in a first original animal face sample image.

The second human face sample image is obtained by performing human face position adjustment on a second original human face sample image based on second correspondence between human face key points in the second original human face sample image and the animal face key points on the first original animal face sample image.

The first animal face sample image is obtained by performing animal face position adjustment on the first original animal face sample image based on the first correspondence or the second correspondence.

That is, considering the difference between the animal face and the human face, before obtaining the first animal face style sample image corresponding to the first human face sample image by using the animal face generation model, the first correspondence between the human face key point on the first original human face sample image and the animal face key points on the first original animal face sample image is determined, so that the human face position adjustment is performed on the first original human face sample image based on the first correspondence, to obtain the first human face sample image that meets the input requirements (for example, the human face position on the image, the size of the image, and the like) of the animal face generation model or the animal face style image generation model. Similarly, the first animal face sample image may be obtained in advance by performing animal face position adjustment on the first original animal face sample image based on the first correspondence. The first animal face sample image also meets the input requirements of the model.

As an example, after the first correspondence is determined, an affine transformation matrix for adjusting the human face position on the first original human face sample image is constructed based on the human face key points involved in the first correspondence, and the human face position on the first original human face sample image is adjusted based on the affine transformation matrix to obtain the first human face sample image. An affine transformation matrix for adjusting the animal face position on the first original animal face sample image is constructed based on the animal face key points involved in the first correspondence, and the animal face position on the first original animal face sample image is adjusted based on the affine transformation matrix to obtain the first animal face sample image. The affine transformation matrix may be constructed by following the affine transformation principle. Moreover, the affine transformation matrix may be related to a parameter such as a scaling parameter or a cropping ratio of the first original human face sample image or the first original animal face sample image. That is, in the adjustment of the human face position or the adjustment of the animal face position, the involved image processing operation may include cropping, scaling, rotation, and the like, which may be determined according to image processing requirement.

Image adjustment is performed based on the correspondence between key points, hence the obtained first human face sample image has the same size as the obtained first animal face sample image, and the human face region in the first human face sample image corresponds to the same position as the animal face region in the first animal face sample image. For example, the human face region is arranged in the center of the first human face sample image, and the animal face region is also arranged in the center of the first animal face sample image. In addition, a difference between an area of the human face region and an area of the animal face region is less than an area threshold (may be set flexibly). That is, the area of the human face region matches the area of the animal face region, which ensures to generate the first animal face style sample image with a good display effect by using the animal face generation model, ensures to obtaining the animal face style image generation model by using high-quality training samples, ensures a good model training effect. Hence, the display effect of the animal face style image generated by the animal face style image generation model is not affected due to the mismatch between the animal face region and the human face region, for example, too large or too small animal face region as compared to the human face region.

Similarly, before training to obtain the animal face generation model, the second correspondence between the human face key points in the second original human face sample image and the animal face key points in the first original animal face sample image may be determined. Then a human face position on the second original human face sample image is adjusted based on the second correspondence to obtain a second human face sample image that meets the input requirements of the image generation model, where the involved image processing operation may include cropping, scaling, rotation, and the like. Apparently, according to a requirement order for the first animal face sample image, the animal face position on the first original animal face sample image may be pre-adjusted based on the second correspondence to obtain the first animal face sample image that meets the input requirements of the image generation model.

As an example, after the second correspondence is determined, an affine transformation matrix for performing human face position adjustment on the second original human face sample image may be constructed based on the human face key points involved in the second correspondence, and an affine transformation matrix for performing animal face position adjustment on the first original animal face sample image may be constructed based on the animal face key points involved in the second correspondence. The obtained second human face sample image has the same size as the obtained first animal face sample image, and a human face region in the second human face sample image corresponds to a same position as an animal face region in the first animal face sample image. For example, the human face region is arranged in the center of the second human face sample image, and the animal face region is also arranged in the center of the first animal face sample image. In addition, a difference between an area of the human face region and an area of the animal face region is less than an area threshold (may be set flexibly). That is, the area of the human face region matches the area of the animal face region, ensuring a good model training effect based on high-quality training samples.

In an embodiment, the animal face style image generation model is obtained by training with the first human face sample image and the second animal face style sample image. The second animal face style sample image is obtained by replacing a background region of the first animal face style sample image with a background region of the first human face sample image. Through the background replacement, an influence of the background region of the animal face style sample image exerted on the model training effect can be minimized when training the animal face style image generation model, which ensures a good model training effect, thereby ensuring that the generated animal face style image has a good display effect.

Further, the second animal face style sample image is obtained by fusing the first animal face style sample image and the first human face sample image based on a second animal face mask image. The second animal face mask image is obtained from the first animal face style sample image by using a pre-trained animal face segmentation model. The second animal face mask image is configured for determining the animal face region in the first animal face style sample image as the animal face region in the second animal face style sample image. The animal face segmentation model may be obtained by training with the second animal face sample image and a marking of position of the animal face region in the second animal face sample image. Under the premise of ensuring that the animal face segmentation model has a function of generating a mask image corresponding to the animal face region in the image, those skilled in the art can obtain the animal face segmentation model with any available training method, which is not limited in the disclosure.

In the embodiments of the present disclosure, the animal face style image generation model may be pre-trained in a server, and then the animal face style image generation model is sent to the terminal for being called to generate an animal face style image corresponding to the original human face image, which enriches image editing functions of the terminal. Taking a video interactive application as an example, the animal face style image generation model is called to obtain the animal face style image corresponding to the original human face image, which not only enriches image editing function of the application, but also enhances the fun of the application, providing users with relatively new special effects and improving the user experience. In addition, with the animal face style image generation model, animal face style images matching original human face images can be dynamically generated for different users, improving intelligence in generation of the animal face style images and presenting a better image effect.

Figure 2:
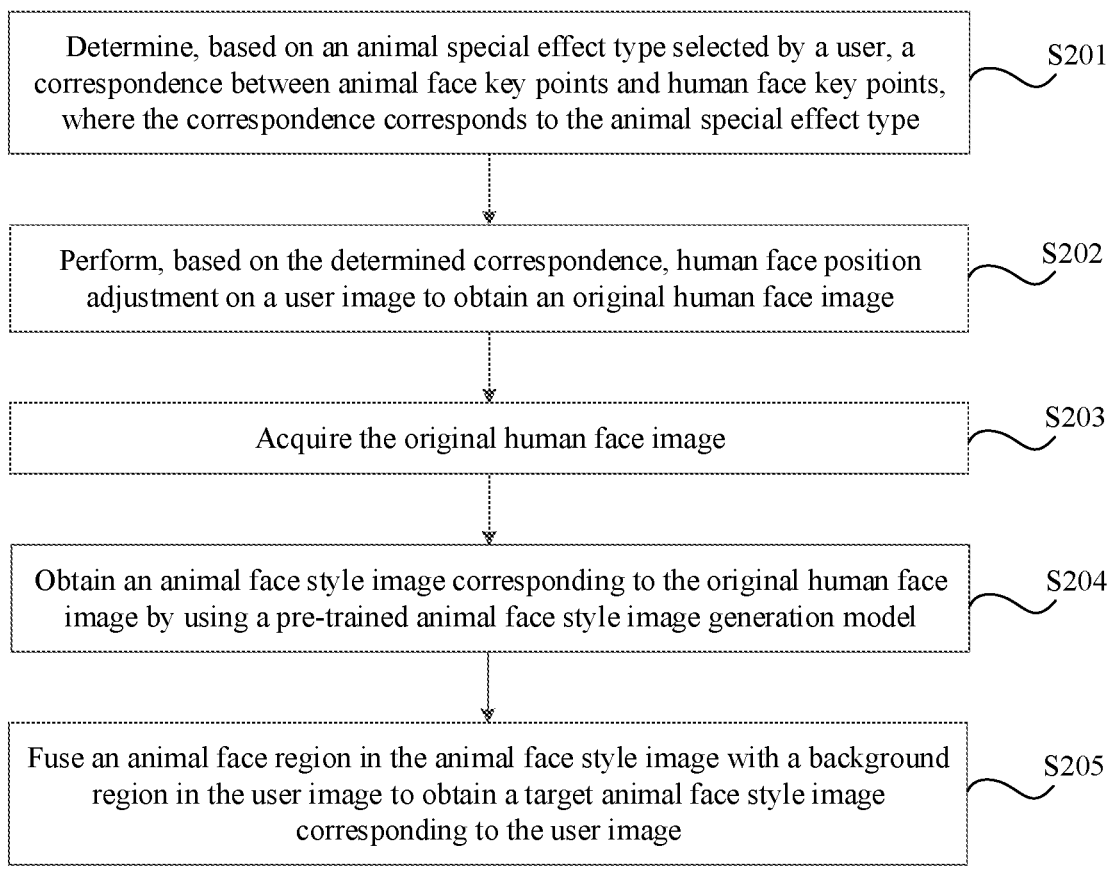
FIG. 2 is a flowchart of a method for generating an animal face style image according to another embodiment of the present disclosure.

FIG. 2 is a flowchart of a method for generating an animal face style image according to another embodiment of the present disclosure. The method shown in FIG. 2 is obtained by further optimizing and extending the technical solution described above, and may be combined with the above optional embodiments.

As shown in FIG. 2, the method for generating an animal face style image according to this embodiment of the present disclosure may include the following steps S201 to S205.

In step S201, correspondence between animal face key points and human face key points is determined based on an animal special effect type selected by a user, where the correspondence corresponds to the animal special effect type.

For example, after the user enables an application or a mini program having a function of generating a style image on a terminal, the application or mini program may display an interface for selecting an animal feature type to the user. The animal feature type may be defined according to animal species, such as a cat face special effect or a dog face special effect. The animal feature type may be alternatively defined according to animal breed, such as a civet cat face special effect or a Persian cat face special effect. The terminal determines, based on the animal special effect type selected by the user, an animal to which the user desirable animal face style image corresponds, and thus determines correspondence between the animal's face key points and the human face key points. The correspondence may be pre-stored in the terminal for being called by the terminal based on the animal special effect type. Apparently, the terminal may first determine the animal face corresponding to the animal special effect type selected by the user and recognize the human face key points in the user image, and then establish the correspondence between animal face key points and the human face key points. The user image may be obtained by the terminal based on an image selection operation, an image capture operation or an image upload operation performed by the user on the terminal.

In step S202, a human face position adjustment is performed on the user image based on the determined correspondence to obtain an original human face image.

The human face position adjustment is performed on the user image based on the determined correspondence between the animal face key points and the human face key points to obtain the original human face image. The original human face image meets input requirements of an animal face style image generation model. After the animal face style image generation model is trained, the input requirements (such as a human face position on the image, and a size of the image) of the model are determined. Therefore, after recognizing the human face key points in the user image using key point recognition technology, the terminal performs human face position adjustment on the user image based on the determined correspondence. For example, the terminal may construct an affine transformation matrix for adjusting the human face position on the user image by using the face key points involved in the correspondence, and perform human face position adjustment on the user image using the affine transformation matrix, to obtain the original human face image that meets the input requirements of the animal face style image generation model, where involved image processing operation may include cropping, scaling, rotation, and the like.

In step S203, the original human face image is acquired.

In step S204, an animal face style image corresponding to the original human face image is obtained by using a pre-trained animal face style image generation model.

In step S205, an animal face region in the animal face style image is fused with a background region in the user image to obtain a target animal face style image corresponding to the user image.

The background region in the user image refers to a remaining image region in the user image excluding the face area. For example, the animal face region may be extracted from the animal face style image and the background region may be extracted from the user image by using the image processing technology. Then the animal face region of the animal face style image and the background region of the user image are fused (also referred to as combined) according to positions of the background region and the human face region in the user image. That is, on the target animal face style image finally displayed to the user, except that the user's facial features are transformed into animal facial features, the background is the same as the background region in the user image, avoiding a change of the background region of the user image in the generation of the animal face style image.

In an embodiment, fusing the animal face region in the animal face style image and the background region in the user image to obtain the target animal face style image corresponding to the user image may include: obtaining, based on the animal face style image, an intermediate image with a same size as the user image; where a position of the animal face region in the intermediate image is the same as a position of the human face region in the user image, and for example, the animal face style image may be mapped to image coordinates corresponding to the user image according to the correspondence between the animal face key points in the animal face style image and the human face key points in the user image, to obtain the intermediate image; determining a first animal face mask image corresponding to the animal special effect type; and fusing, based on the first animal face mask image, the user image and the intermediate image to obtain the target animal face style image corresponding to the user image, where the first animal face mask image is used for determining the animal face region in the intermediate image as the animal face region in the target animal face style image.

The user image and the intermediate image are fused by using the first animal face mask image, which improves an efficiency of image fusion under the premise of ensuring the generation of the target animal face style image.

Further, the fusing, based on the first animal face mask image, the user image and the intermediate image to obtain the target animal face style image corresponding to the user image may include: performing smooth processing such as Gaussian blur processing on an animal face boundary on the first animal face mask image; and fusing the user image and the intermediate image based on the animal face mask image subjected to the smooth processing, to obtain the target animal face style image corresponding to the user image.

By performing smooth processing on the animal face boundary on the first animal face mask image and then using the first animal face mask image in the image fusion, smooth transition between the background region in the user image and the animal face region in the intermediate image is realized, thereby optimizing image fusion effect and ensuring a final display effect of the target animal face style image.

In addition, after the target animal face style image corresponding to the user image is obtained or after the animal face style image corresponding to the original human face image is obtained, a special effect identification selected by the user may be determined based on a special effect selection operation performed by the user on an image editing interface, and a special effect corresponding to the special effect identification selected by the user is added to the target animal face style image or the animal face style image, further improving the fun of image editing. Special effects selectable by the user may include any type of props or stickers, which is not limited in the disclosure.

In the embodiments of the present disclosure, after the user image is obtained, the human face position adjustment is performed on the user image based on the correspondence between the animal face key points and the human face key points, to obtain the original human face image, where the correspondence corresponds to the animal face special effect type selected by the user. Then the animal face style image corresponding to the original human face image is obtained by using the animal face style image generation model. Finally, the animal face region in the animal face style image and the background region in the user image are fused to obtain the target animal face style image to be displayed to the user. The user's facial features are animalized, and the original background on the user image is retained, which enriches the image editing functions of the terminal. Taking a video interactive application as an example, the animal face style image generation model is called to obtain the animal face style image, which not only enriches image editing functions of the application, but also enhances fun of the application, thereby providing new special effects for users and improving user experience.

Figure 3:
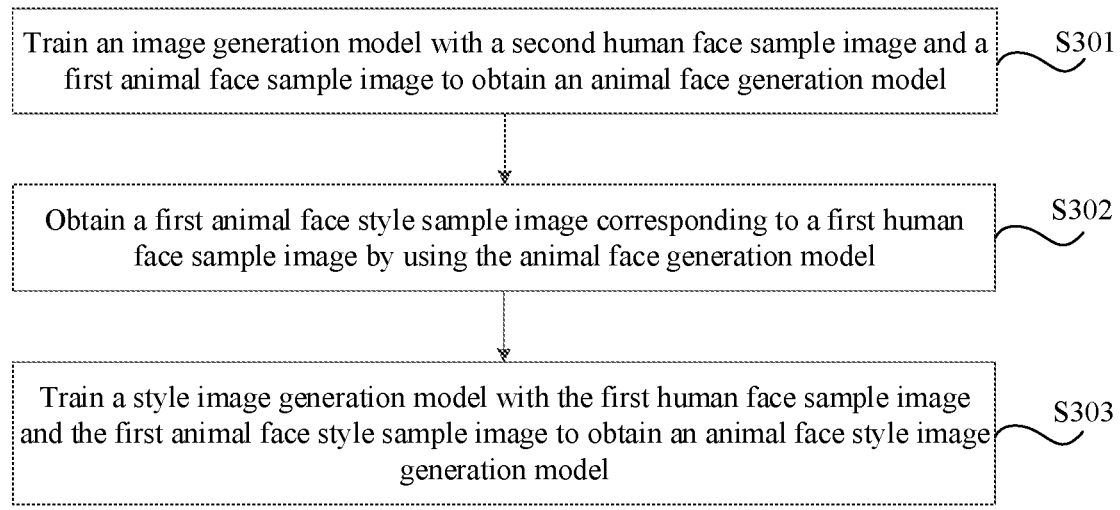
FIG. 3 is a flowchart of a method for training an animal face style image generation model according to an embodiment of the present disclosure.

FIG. 3 is a flowchart of a method for training an animal face style image generation model according to an embodiment of the present disclosure. The method is used to train an animal face style image generation model having a function of transforming a human face into an animal face. The method for training an animal face style image generation model may be performed by an apparatus for training an animal face style image generation model. The apparatus may be implemented by software and/or hardware, and may be integrated in a server.

The method for training an animal face style image generation model according to an embodiment of the present disclosure and the method for generating an animal face style image according to an embodiment of the present disclosure are performed in cooperation. For the contents not explained in detail in the following embodiments, reference may be made to the description of the above embodiments.

As shown in FIG. 3, the method for training an animal face style image generation model according to an embodiment of the present disclosure may include the following steps S301 to S303.

In step S301, an image generation model is trained with a second human face sample image and a first animal face sample image to obtain an animal face generation model.

In step S302, a first animal face style sample image corresponding to a first human face sample image is obtained by using the animal face generation model.

The first animal face style sample image refers to an image obtained by transforming a human face on the first face sample image into an animal face.

In step S303, a style image generation model is trained with the first human face sample image and the first animal face style sample image to obtain an animal face style image generation model.

The animal face style image generation model is used for obtaining an animal face style image corresponding to an original human face image. The animal face style image refers to an image obtained by transforming a human face on the original human face image into an animal face.

In an embodiment, before the image generation model is trained with the second human face sample image and the first animal face sample image to obtain the animal face generation model, the method for training the animal face style image generation model according to an embodiment of the present disclosure further includes: determining a second correspondence between human face key points in a second original human face sample image and animal face key points in a first original animal face sample image; performing human face position adjustment on the second original human face sample image based on the second correspondence to obtain the second human face sample image; and performing animal face position adjustment on the first original animal face sample image based on the second correspondence to obtain the first animal face sample image.

Before generating the first animal face style sample image corresponding to the first human face sample image by using the animal face generation model, the method for training the animal face style image generation model according to an embodiment of the present disclosure further includes: determining a first correspondence between face key points in a first original human face sample image and animal face key points in the first original animal face sample image; and performing animal face position adjustment on the first original human face sample image based on the first correspondence to obtain the first human face sample image.

In an embodiment, after the first animal face style sample image corresponding to the first human face sample image is obtained by using the animal face generation model, the method for training the animal face style image generation model according to an embodiment of the present disclosure further includes: replacing a background region in the first animal face style sample image with a background region in the first human face sample image to obtain the second animal face style sample image.

Accordingly, training the style image generation model with the first human face sample image and the first animal face style sample image to obtain the animal face style image generation model includes: training the style image generation model with the first human face sample image and the second animal face style sample image to obtain the animal face style image generation model.

In an embodiment, the replacing the background region in the first animal face style sample image with the background region in the first human face sample image to obtain the second animal face style sample image includes: obtaining an animal face mask image corresponding to the first animal face style sample image by using a pre-trained animal face segmentation model; and fusing the first animal face style sample image with the first human face sample image based on the animal face mask image to obtain the second animal face style sample image. The animal face mask image is used for determining an animal face region in the first animal face style sample image as an animal face region in the second animal face style sample image.

In an embodiment, the method for training the animal face style image generation model according to an embodiment of the present disclosure further includes: acquiring a second animal face sample image and a marking of position of the animal face region in the second animal face sample image; and training with the second animal face sample image and the marking of position of the animal face region to obtain the animal face segmentation model.

In the embodiments of the present disclosure, the animal face style image generation model may be pre-trained in a server, and then the animal face style image generation model is sent to the terminal for being called to generate the animal face style image corresponding to the original human face image, which enriches image editing functions of the terminal. Taking a video interactive application as an example, the animal face style image generation model is called to obtain the animal face style image corresponding to the original human face image, which not only enriches image editing functions of the application, but also enhances fun of the video interactive application, providing users with relatively new special effects and improving the user experience.

Figure 4:
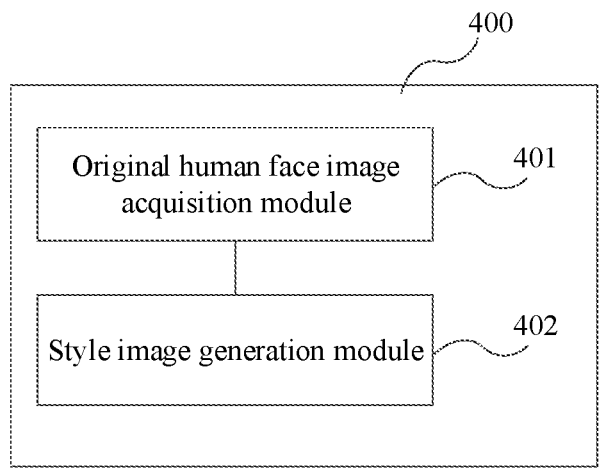
FIG. 4 is a schematic structural diagram of an apparatus for generating an animal face style image according to an embodiment of the present disclosure.

FIG. 4 is a schematic structural diagram of an apparatus for generating an animal face style image according to an embodiment of the present disclosure. The apparatus is applicable in a case of transforming a user face into an animal face. The apparatus for generating an animal face style image may be implemented by software and/or hardware. The apparatus may be integrated in any electronic device with a computing function, such as a smart phone, a tablet, a laptop or like user terminals.

As shown in FIG. 4, the apparatus 400 for generating an animal face style image according to an embodiment of the present disclosure includes an original human face image acquisition module 401 and a style image generation module 402.

The original human face image acquisition module 401 is configured to acquire an original human face image.

The style image generation module 402 is configured to obtain an animal face style image corresponding to the original human face image by using a pre-trained animal face style image generation model.

The animal face style image refers to an image obtained by transforming a human face on the original human face image into an animal face. The animal face style image generation model is obtained by training with the first face sample image and the first animal face style sample image.

In an embodiment, the first animal face style sample image is generated by a pre-trained animal face generation model based on a first human face sample image. The animal face generation model is obtained by training with a second human face sample image and a first animal face sample image.

In an embodiment, the apparatus 400 according to an embodiment of the present disclosure further includes a correspondence determination module, a human face position adjustment module, and an image fusion module.

The correspondence determination module is configured to determine a correspondence between animal face key points and the human face key points based on an animal special effect type selected by a user, where the correspondence corresponds to the animal special effect type.

The human face position adjustment module is configured to perform human face position adjustment on the user image based on the correspondence between the animal face key points and the human face key points to obtain the original human face image, where the correspondence corresponds to the animal special effect type. The original human face image meets the input requirements of the animal face style image generation model.

In an embodiment, the image fusion module is configured to fuse the animal face region in the animal face style image with the background region in the user image to obtain a target animal face style image corresponding to the user image.

In an embodiment, the image fusion module includes an intermediate image determination unit, a first animal face mask image determination unit, and an image fusion unit.

The intermediate image determination unit is configured to obtain an intermediate image with a same size as the user image based on the animal face style image. A position of the animal face region in the intermediate image is the same as a position of the human face region in the user image.

The first animal face mask image determination unit is configured to determine a first animal face mask image corresponding to the animal special effect type.

The image fusion unit is configured to fuse, based on the first animal face mask image, the user image with the intermediate image to obtain the target animal face style image corresponding to the user image, where the first animal face mask image is used for determining the animal face region in the intermediate image as the animal face region in the target animal face style image In an embodiment, the first human face sample image is obtained by performing human face position adjustment on a first original human face sample image based on first correspondence between human face key points in the first original human face sample image and animal face key points in a first original animal face sample image.

The second human face sample image is obtained by performing human face position adjustment on a second original human face sample image based on second correspondence between human face key points in the second original human face sample image and the animal face key points in the first original animal face sample image.

The first animal face sample image is obtained by performing animal face position adjustment on the first original animal face sample image based on the first correspondence or the second correspondence.

In an embodiment, the animal face style image generation model is obtained by training with the first human face sample image and the second animal face style sample image. The second animal face style sample image is obtained by replacing a background region of the first animal face style sample image with a background region of the first human face sample image.

In an embodiment, the second animal face style sample image is obtained by fusing the first animal face style sample image with the first human face sample image based on a second animal face mask image.

The second animal face mask image is obtained by a pre-trained animal face segmentation model based on the first animal face style sample image. The second animal face mask image is used for determining the animal face region in the first animal face style sample image as the animal face region in the second animal face style sample image.

The apparatus for generating an animal face style image according to an embodiment of the present disclosure may perform any method for generating an animal face style image according to the embodiments of the present disclosure, and the apparatus includes functional modules for implementing the method and has similar beneficial effects. For the content not described in detail in the apparatus embodiments of the present disclosure, reference may be made to the description in any method embodiment of the present disclosure.

Figure 5:
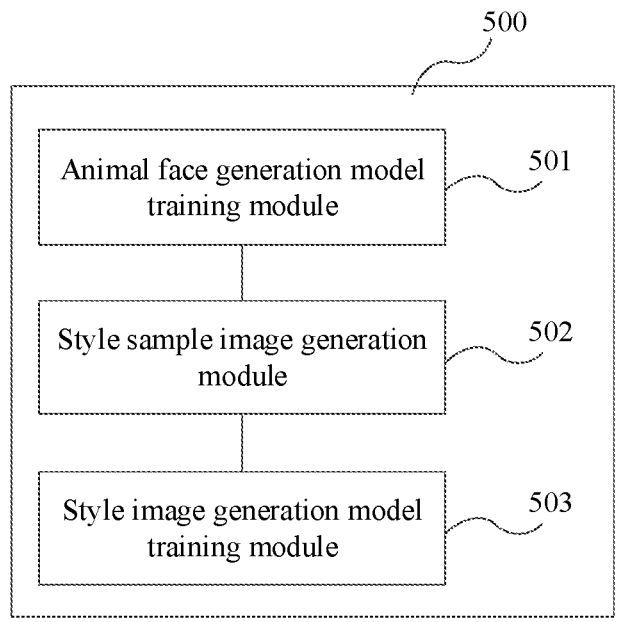
FIG. 5 is a schematic structural diagram of an apparatus for training an animal face style image generation model according to an embodiment of the present disclosure.

FIG. 5 is a schematic structural diagram of an apparatus for training an animal face style image generation model according to an embodiment of the present disclosure. The apparatus is applied to train an animal face style image generation model having a function of transforming a human face into an animal face. The apparatus for training an animal face style image generation model may be implemented by software and/or hardware, and may be integrated in a server.

As shown in FIG. 5, an apparatus 500 for training an animal face style image generation model according to an embodiment of the present disclosure may include an animal face generation model training module 501, a style sample image generation module 502, and a style image generation model training module 503.

The animal face generation model training module 501 is configured to train an image generation model with a second human face sample image and a first animal face sample image to obtain an animal face generation model.

The style sample image generation module 502 is configured to obtain a first animal face style sample image corresponding to a first human face sample image by using the animal face generation model. The first animal face style sample image refers to an image obtained by transforming a human face on the first face sample image into an animal face.

The style image generation model training module 503 is configured to train a style image generation model with the first human face sample image and the first animal face style sample image to obtain the animal face style image generation model.

The animal face style image generation model is used to obtain an animal face style image corresponding to an original human face image. The animal face style image refers to an image obtained by transforming a human face on the original human face image into an animal face.

In an embodiment, the apparatus 500 according to an embodiment of the present disclosure further includes: a second correspondence determination module, a human face position adjustment module, an animal face position adjustment module, and a first correspondence determination module.

The second correspondence determination module is configured to determine a second correspondence between face key points in a second original human face sample image and animal face key points in a first original animal face sample image.

The face position adjustment module is configured to perform human face position adjustment on the second original human face sample image based on the second correspondence to obtain a second human face sample image.

The animal face position adjustment module is configured to perform animal face position adjustment on the first original animal face sample image based on the second correspondence to obtain the first animal face sample image.

The first correspondence determination module is configured to determine a first correspondence between face key points in the first original human face sample image and animal face key points in the first original animal face sample image.

The human face position adjustment module is further configured to perform animal face position adjustment on the first original human face sample image based on the first correspondence to obtain the first human face sample image.

In an embodiment, the apparatus 500 according to an embodiment of the present disclosure further includes a background region replacement module.

The background region replacement module is configured to replace a background region in the first animal face style sample image with a background region in the first human face sample image to obtain a second animal face style sample image.

In an embodiment, the style image generation model training module 503 is specifically configured to train a style image generation model with the first human face sample image and the second animal face style sample image to obtain the animal face style image generation model.

In an embodiment, the background region replacement module includes an animal face mask image determination unit and an image fusion unit.

The animal face mask image determination unit is configured to obtain an animal face mask image corresponding to the first animal face style sample image by using a pre-trained animal face segmentation model.

The image fusion unit is configured to fuse the first animal face style sample image with the first human face sample image based on the animal face mask image to obtain a second animal face style sample image. The animal face mask image is used for determining an animal face region in the first animal face style sample image as an animal face region in the second animal face style sample image.

In an embodiment, the apparatus 500 according to an embodiment of the present disclosure further includes a sample image and marking result acquisition module and an animal face segmentation model training module.

The sample image and marking result acquisition module is configured to acquire a second animal face sample image and a marking of position of the animal face region in the second animal face sample image.

The animal face segmentation model training module is configured to train the animal face segmentation model with the second animal face sample image and the marking of position of the animal face region.

The apparatus for training an animal face style image generation model according to the embodiment of the present disclosure may perform any method for training an animal face style image generation model according to the embodiment of the present disclosure, and the apparatus has functional modules for implementing the method and beneficial effects. For the content not described in detail in the apparatus embodiments of the present disclosure, reference may be made to the description in any method embodiment of the present disclosure.

Figure 6:
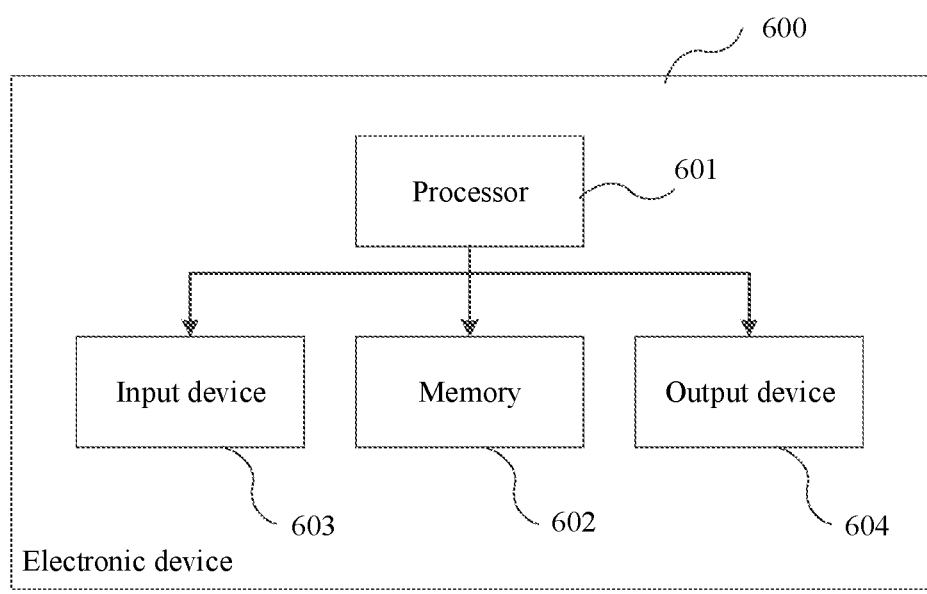
FIG. 6 is a schematic structural diagram of an electronic device according to an embodiment of the present disclosure.

FIG. 6 is a schematic structural diagram of an electronic device according to an embodiment of the present disclosure, which is used for illustrating the electronic device implementing the method for generating an animal face style image or the method for training an animal face style image generation model according to the embodiments of the present disclosure. The electronic device in the embodiments of the present disclosure may include, but not limited to, a mobile terminal such as a mobile phone, a notebook computer, a digital broadcast receiver, a personal digital assistant (PDA), a tablet computer (PAD), a portable multimedia player (PMP) and an in-vehicle terminal (for example, an in-vehicle navigation terminal), and a fixed terminal such as a digital TV, a desktop computer, and a server. The electronic device shown in FIG. 6 is only an example, and should not impose any limitation on the function and scope of use of the embodiments of the present disclosure.

As shown in FIG. 6, the electronic device 600 includes one or more processors 601 and a memory 602.

The processor 601 may be a central processing unit (CPU) or a processing unit in other form capable of processing data and/or executing instructions. In addition, the processor 601 can control other components in the electronic device 600 to perform desired functions.

The memory 602 may include one or more computer program products. The computer program product may include various forms of computer-readable storage media, such as a volatile memory and/or a non-volatile memory. The volatile memory may include, for example, a random access memory (RAM) and/or a cache, and the like. The nonvolatile memory may include, for example, a read-only memory (ROM), a hard disk, a flash memory, and the like. One or more computer program instructions may be stored on the computer-readable storage medium. The processor 601 executes the program instructions to implement the method for generating an animal face style image or the method for training an animal face style image generation model according to the embodiments of the present disclosure, as well as other desired functions. Various contents such as input signals, signal components, and noise components may further be stored in the computer-readable storage medium.

The method for generating an animal face style image may include: acquiring an original human face image; and obtaining an animal face style image corresponding to the original human face image using a pre-trained animal face style image generation model. The animal face style image refers to an image obtained by transforming a human face on the original human face image into an animal face. The animal face style image generation model is obtained by training with a first human face sample image and a first animal face style sample image. The first animal face style sample image is generated from the first human face sample image by a pre-trained animal face generation model. The animal face generation model is obtained by training with a second human face sample image and a first animal face sample image.

The method for training an animal face style image generation model may include: training an image generation model with a second human face sample image and a first animal face sample image to obtain an animal face generation model; obtaining a first animal face style sample image corresponding to a first human face sample image by using the animal face generation model, where the first animal face style sample image refers to an image obtained by transforming a human face on the first human face sample image into an animal face; training a style image generation model with the first human face sample image and the first animal face style sample image to obtain the animal face style image generation model. The animal face style image generation model is used for obtaining an animal face style image corresponding to an original human face image. The animal face style image refers to an image obtained by transforming a human face on the original human face image into an animal face.

It should be understood that the electronic device 600 may implement other optional solutions provided in the method embodiments of the present disclosure.

In an example, the electronic device 600 may further include an input device 603 and an output device 604. These components are interconnected through a bus system and/or other forms of connection mechanism (not shown).

In addition, the input device 603 may include, for example, a keyboard, a mouse, and the like.

The output device 604 outputs various information, including determined distance information, direction information, or the like. The output device 604 may include, for example, a display, a speaker, a printer, a communication network, a remote output device connected the communication network, and the like.

Apparently, for briefness, only some of the components in the electronic device 600 that are related to the present disclosure are shown in FIG. 6, and components such as bus and input/output interface are omitted. In addition, the electronic device 600 may include any other appropriate components in practice.

In addition to the above methods and apparatus, a computer program product may further be provided according to an embodiment of the present disclosure. The computer program product includes computer program instructions that, when executed by a processor, cause the processor to implement the method for generating an animal face style image or the method for training an animal face style image generation model according to the embodiments of the present disclosure.

The computer program product may include program codes for implementing the operations according to the embodiments of the present disclosure, which are written in any combination of one or more programming languages. The programming languages include object-oriented programming languages such as Java and C++, and conventional procedural programming languages such as "C" language or similar programming languages. The program codes may be completely executed on an electronic device of a user, partially executed on the electronic device of the user, executed as an independent software package, partially executed on the electronic device of the user and partially executed on a remote electronic device, or completely executed on a remote electronic device.

In addition, a computer-readable storage medium is further provided according to an embodiment of the present disclosure. The computer-readable storage medium stores computer program instructions that, when executed by a processor, cause the processor to implement the method for generating an animal face style image or the method for training an animal face style image generation model according to the embodiments of the present disclosure.

The method for generating an animal face style image may include: acquiring an original human face image; and obtaining an animal face style image corresponding to the original human face image using a pre-trained animal face style image generation model. The animal face style image refers to an image obtained by transforming a human face on the original human face image into an animal face. The animal face style image generation model is obtained by training with a first human face sample image and a first animal face style sample image. The first animal face style sample image is generated from the first human face sample image by a pre-trained animal face generation model. The animal face generation model is obtained by training with a second human face sample image and a first animal face sample image.

The method for training an animal face style image generation model may include: training an image generation model with a second human face sample image and a first animal face sample image to obtain an animal face generation model; obtaining a first animal face style sample image corresponding to a first human face sample image by using the animal face generation model, where the first animal face style sample image refers to an image obtained by transforming a human face on the first human face sample image into an animal face; training a style image generation model with the first human face sample image and the first animal face style sample image to obtain the animal face style image generation model. The animal face style image generation model is used for obtaining an animal face style image corresponding to an original human face image. The animal face style image refers to an image obtained by transforming a human face on the original human face image into an animal face.

It should be understood that the computer program instructions, when executed by a processor, may further cause the processor to implement other optional solutions according to the method embodiments of the present disclosure.

The computer-readable storage medium may be any combination of one or more readable media. The readable medium may be a readable signal medium or a readable storage medium. The readable storage medium may include but is not limited to, for example, an electrical, magnetic, optical, electromagnetic, infrared, or semiconductor system, apparatus, or device, or any combination thereof. Specific examples (not exhaustive) of the readable storage medium include: electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any appropriate combination thereof.

It should be noted that the relational terms "first", "second" and the like in the present disclosure are used for distinguishing an entity or operation from another entity or operation, rather than requiring or implying an actual relationship or order between these entities or operations. Further, the terms "include", "comprise" or any variant thereof are intended to encompass nonexclusive inclusion so that a process, method, article or apparatus including a series of elements includes not only those elements but also other elements which have not been listed definitely or an element (s) inherent to the process, method, article or apparatus. Unless expressively limited otherwise, a process, method, article or apparatus limited by "comprising/including a(an) . . . " does not exclude existence of another identical element in such process, method, article or apparatus.

The above are only specific embodiments of the present disclosure, so that those skilled in the art can understand or implement the present disclosure. It is apparent for those skilled in the art to make various modifications to these embodiments. The general principle defined herein may be applied to other embodiments without departing from the spirit or the scope of the present disclosure. Therefore, the present disclosure is not limited to the embodiments described herein, but should be defined by the broadest scope consistent with the principle and novel features disclosed herein.

The invention claimed is:

1. A method for generating an animal face style image, implemented by an electronic device with a display interface, a processor and a storage, comprising:
   acquiring, by the processor, an original human face image, from the storage of the electronic device or from a camera capturing the original human face image;
   obtaining, by the processor, an animal face style image corresponding to the original human face image by using a pre-trained animal face style image generation model;
   wherein the animal face style image is obtained by transforming a human face on the original human face image into an animal face, the animal face style image generation model is obtained by training with a first human face sample image and a first animal face style sample image, the first animal face style sample image is generated from the first human face sample image by a pre-trained animal face generation model, and the animal face generation model is obtained by training with a second human face sample image and a first animal face sample image; and
   rendering and displaying the animal face style image on the display interface of the electronic device.

2. The method according to claim 1, further comprising:
   determining, based on an animal special effect type selected by a user, a correspondence between animal face key points and human face key points, wherein the correspondence corresponds to the animal special effect type; and
   performing, based on the correspondence between the animal face key points and the human face key points, human face position adjustment on a user image to obtain the original human face image, wherein the correspondence corresponds to the animal special effect type, and the original human face image meets input requirements of the animal face style image generation model.

3. The method according to claim 2, further comprising:
   fusing an animal face region in the animal face style image with a background region in the user image to obtain a target animal face style image corresponding to the user image.

4. The method according to claim 3, wherein the fusing the animal face region in the animal face style image with the background region in the user image to obtain the target animal face style image corresponding to the user image comprises:
   obtaining, based on the animal face style image, an intermediate image with a same image size as the user image, wherein a position of an animal face region in the intermediate image is the same as a position of a human face region in the user image;
   determining a first animal face mask image corresponding to the animal special effect type; and
   fusing, based on the first animal face mask image, the user image with the intermediate image to obtain the target animal face style image corresponding to the user image, wherein the first animal face mask image is used for determining the animal face region in the intermediate image as an animal face region in the target animal face style image.

5. The method according to claim 1, wherein:
the first human face sample image is obtained by performing, based on a first correspondence between face key points in a first original human face sample image and animal face key points in a first original animal face sample image, human face position adjustment on the first original human face sample image;
the second human face sample image is obtained by performing, based on a second correspondence between face key points in a second original human face sample image and animal face key points in the first original animal face sample image, human face position adjustment on the second original human face sample image; and
the first animal face sample image is obtained by performing, based on the first correspondence or the second correspondence, animal face position adjustment on the first original animal face sample image.

6. The method according to claim 1, wherein:
the animal face style image generation model is obtained by training with the first human face sample image and a second animal face style sample image, and the second animal face style sample image is obtained by replacing a background region in the first animal face style sample image with a background region in the first human face sample image.

7. The method according to claim 6, wherein:
the second animal face style sample image is obtained by fusing, based on a second animal face mask image, the first animal face style sample image with the first human face sample image; and
the second animal face mask image is obtained from the first animal face style sample image by a pre-trained animal face segmentation model, wherein the second animal face mask image is used for determining an animal face region in the first animal face style sample image as an animal face region in the second animal face style sample image.

8. A method for training an animal face style image generation model, implemented by an electronic device with a display interface, a processor and a storage, comprising:
training, by the processor, an image generation model with a second human face sample image and a first animal face sample image to obtain an animal face generation model, wherein the second human face sample image and the first animal face sample image is obtained from the storage of the electronic device;
obtaining, by the processor, a first animal face style sample image corresponding to a first human face sample image by using the animal face generation model, wherein the first animal face style sample image refers to an image obtained by transforming a human face on the first human face sample image into an animal face; and
training, by the processor, a style image generation model with the first human face sample image and the first animal face style sample image to obtain an animal face style image generation model;
wherein, the animal face style image generation model is used for obtaining an animal face style image corresponding to an original human face image by transforming a human face on the original human face image into an animal face, and the animal face style image is to be rendered and displayed on the display interface of the electronic device.

9. The method according to claim 8, further comprising:
determining a second correspondence between human face key points in a second original human face sample image and animal face key points in a first original animal face sample image;
performing, based on the second correspondence, human face position adjustment on the second original human face sample image to obtain the second human face sample image; and
performing, based on the second correspondence, animal face position adjustment on the first original animal face sample image based on the second correspondence to obtain the first animal face sample image.

10. The method according to claim 9, further comprising:
determining a first correspondence between face key points in a first original human face sample image and animal face key points in the first original animal face sample image; and
performing, based on the first correspondence, animal face position adjustment on the first original human face sample image to obtain the first human face sample image.

11. The method according to claim 8, further comprising:
replacing a background region in the first animal face style sample image with a background region in the first human face sample image to obtain a second animal face style sample image; and
the training the style image generation model with the first human face sample image and the first animal face style sample image to obtain the animal face style image generation model comprises:
training the style image generation model with the first human face sample image and a second animal face style sample image to obtain the animal face style image generation model.

12. The method according to claim 11, wherein the replacing the background region in the first animal face style sample image with the background region in the first human face sample image to obtain the second animal face style sample image comprises:
obtaining an animal face mask image corresponding to the first animal face style sample image by using a pre-trained animal face segmentation model; and
fusing, based on the animal face mask image, the first animal face style sample image with the first human face sample image to obtain the second animal face style sample image, wherein the animal face mask image is used for determining an animal face region in the first animal face style sample image as an animal face region in the second animal face style sample image.

13. The method according to claim 12, further comprising:
acquiring a second animal face sample image and a marking of position of the animal face region in the second animal face sample image; and
obtaining the animal face segmentation model by training with the second animal face sample image and the marking of position of the animal face region.

14. An electronic device, comprising:
a display interface;
a processor; and
a memory storing a computer program that, when executed by the processor, causes the processor to implement:

acquiring an original human face image, from a storage of the electronic device or from a camera capturing the original human face image;

obtaining an animal face style image corresponding to the original human face image by using a pre-trained animal face style image generation model;

wherein the animal face style image is obtained by transforming a human face on the original human face image into an animal face, the animal face style image generation model is obtained by training with a first human face sample image and a first animal face style sample image, the first animal face style sample image is generated from the first human face sample image by a pre-trained animal face generation model, and the animal face generation model is obtained by training with a second human face sample image and a first animal face sample image; and rendering and displaying the obtained animal face style image on the display interface of the electronic device.

15. The electronic device according to claim 14, wherein the processor further implements:

determining, based on an animal special effect type selected by a user, a correspondence between animal face key points and human face key points, wherein the correspondence corresponds to the animal special effect type; and performing, based on the correspondence between the animal face key points and the human face key points, human face position adjustment on a user image to obtain the original human face image, wherein the correspondence corresponds to the animal special effect type, and the original human face image meets input requirements of the animal face style image generation model.

16. The electronic device according to claim 15, wherein the processor further implements:

fusing an animal face region in the animal face style image with a background region in the user image to obtain a target animal face style image corresponding to the user image.

17. An electronic device, comprising:
a display interface;
a processor; and
a memory storing a computer program that, when executed by the processor, causes the processor to implement:

training an image generation model with a second human face sample image and a first animal face sample image to obtain an animal face generation model, wherein the second human face sample image and the first animal face sample image is obtained from the storage of the electronic device;

obtaining a first animal face style sample image corresponding to a first human face sample image by using the animal face generation model, wherein the first animal face style sample image refers to an image obtained by transforming a human face on the first human face sample image into an animal face; and training a style image generation model with the first human face sample image and the first animal face style sample image to obtain an animal face style image generation model;

wherein, the animal face style image generation model is used for obtaining an animal face style image corresponding to an original human face image by transforming a human face on the original human face image into an animal face, and the animal face style image is to be rendered and displayed on the display interface of the electronic device.

18. The electronic device according to claim 17, wherein the processor further implements:

determining a second correspondence between human face key points in a second original human face sample image and animal face key points in a first original animal face sample image;

performing, based on the second correspondence, human face position adjustment on the second original human face sample image to obtain the second human face sample image; and performing, based on the second correspondence, animal face position adjustment on the first original animal face sample image based on the second correspondence to obtain the first animal face sample image.

19. The electronic device according to claim 18, wherein the processor further implements:

determining a first correspondence between face key points in a first original human face sample image and animal face key points in the first original animal face sample image; and performing, based on the first correspondence, animal face position adjustment on the first original human face sample image to obtain the first human face sample image.

* * * * *